United States Patent Office 2,821,234
Patented Jan. 28, 1958

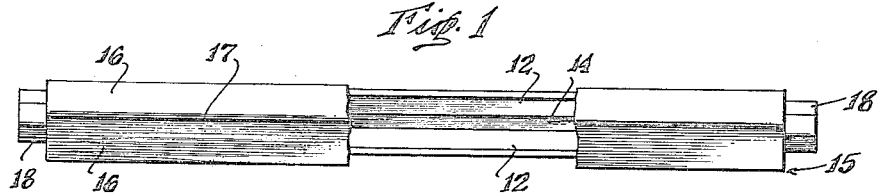
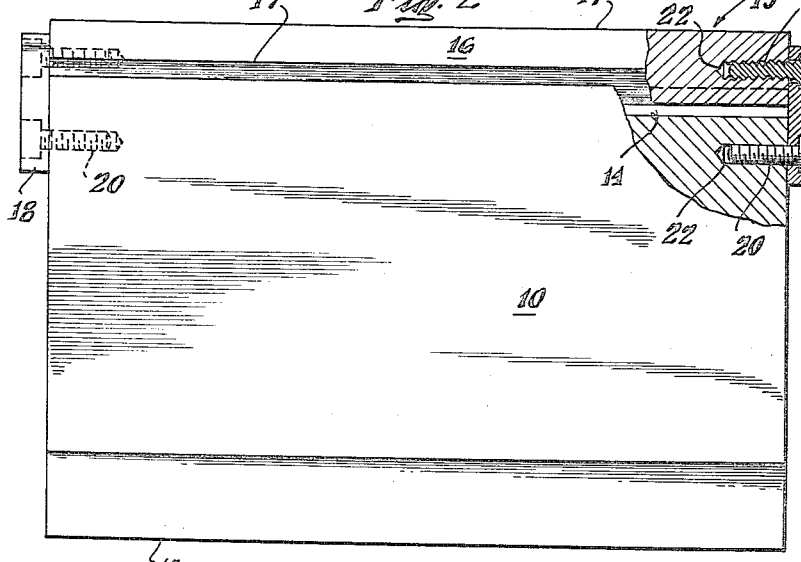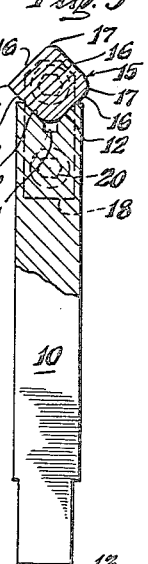
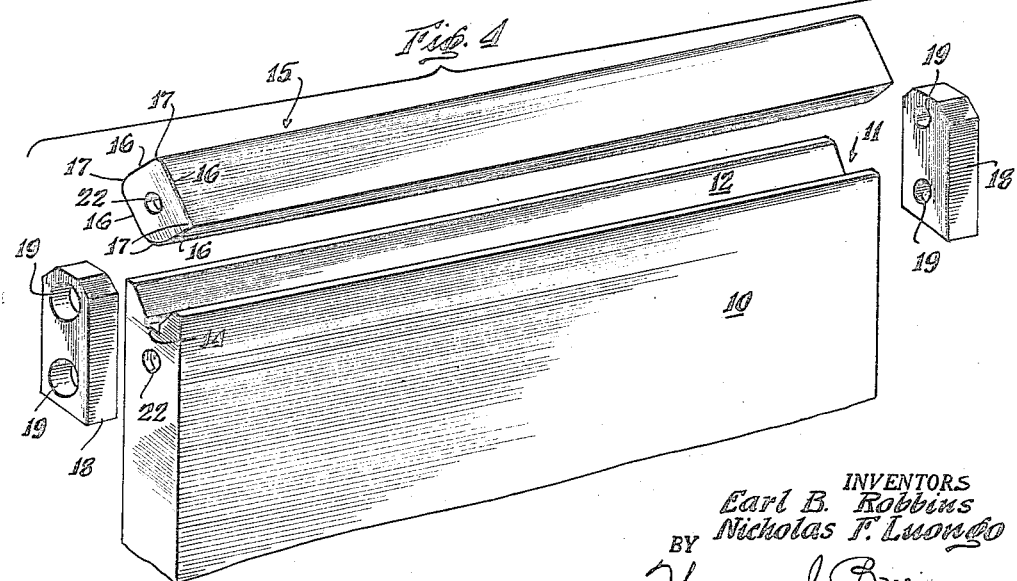

2,821,234

CHANGEABLE-FACE DIE MECHANISM

Earl B. Robbins, Cedar Grove, and Nicholas F. Luongo, Irvington, N. J.

Application April 9, 1953, Serial No. 347,694

5 Claims. (Cl. 153—21)

This invention relates to bending and forming dies of the type adaptable for use in press brakes and more particularly to a die device which has a plurality of die faces or work-engaging portions which may be readily interchanged.

Press brakes and other similar types of machines adaptable for use in the bending and forming of iron, steel, aluminum and other similar materials employ dies having selected work-engageable faces for forming or bending the work. The dies are generally unitary members which are locked in one of the jaws of the press brake and require considerable time to insert or remove. The provision of a separate shank or stock for each die by which it may be locked in the machine makes such dies expensive to manufacture and heavy and unwieldy when positioning them in or removing them from a machine.

An important object of this invention is to provide a die device having a readily removable die head with selectively interchangeable work-engaging portions or dies which may be changed without the removal of the entire die device from the machine. Another object of the invention is to provide a die device which is less expensive than existing dies and which provides more than one die shape.

The invention includes a die holder member which remains locked in the jaw of the machine. The die holder has a die-head-receiving trough defined by two faces at right angles to each other. The die head of the invention has a plurality of flat faces with adjacent faces at right angles to each other. The dies or work-engageable portions of the die head are disposed between the flat faces thereof. The die head is adapted to be supported with two of its right angularly disposed flat faces in contact with the right angularly disposed surfaces of the trough in the holder with the selected work-engageable face in work-engaging position on the exposed side of the die head. Means are provided for releasably retaining the die head in the trough. The die head may have four right angularly disposed flat faces with four different work-engageable dies or portions one being disposed between each two adjacent flat faces of the die head. A new die, work-engageable portion may be positioned for work engaging by releasing the die head from the trough and rotating the die head to the desired position.

For a more complete description of the invention, reference is made to the drawings wherein:

Fig. 1 is a top view of a die head in a die holder embodying this invention with part of the die head cut away to show the die-head-receiving trough;

Fig. 2 is a side view with part cut away showing the relationship of the die head, die holder and means for releasably retaining the die head in the holder;

Fig. 3 is an end view partly in section; and

Fig. 4 is an exploded perspective view of the device.

The device of this invention includes a die holder 10 having a die-head-receiving trough 11 which is defined in the upper edge of the holder by the surfaces 12 which are disposed at right angles to each other. The die holder has a shank portion 13 which is adapted to be received in the jaw of a die forming machine and be locked therein. The die holder and the die, which will be described below, may be of any suitable lateral extent depending on the size of the machine and the material being formed or bent.

A die head or member 15 is adapted for use in the device and has flat faces 16 which are arranged with adjacent faces at right angles to each other. Work-engageable portions 17 of selected shape are disposed between the several faces of the die head. As shown in the drawings, the work-engageable portions 17 include a right angular edge and several rounded shapes of various radii. These are merely examples of the shapes which may be used and it will be understood that other shapes may be used.

As best shown in Fig. 3, the die head is so shaped that two adjacent right angularly disposed faces 16 are adapted to be seated in the trough 11 in face to face contact with the right angularly disposed surfaces 12 of the trough. Suitable releasable retaining means may be employed for holding the die in the fully seated position shown. One such means as illustrated includes link members 18 which have holes 19 to receive screws 20. The screws 20 after passing through the holes 19 are received in threaded holes 22 tapped into the ends of the die holder 10 and of the die head or member 15.

In order to put a selected die or work-engageable portion 17 in work-engaging position, the die head 15 is placed in the trough with the two faces 16 remote from that portion or die engagement with the surfaces 12 of the trough 11, so that the selected work-engageable portion or die is uppermost as viewed in the drawings.

In the device shown, the die head is provided with four flat faces and with four dies or work-engageable portions 17. Any one of the four portions 17 may be disposed in work-engaging position by removing the screws 20 which are in the ends of the die head 15, lifting the die head so that it may be revolved to present the selected die or portion 17 uppermost. Then the die head may be reseated and the screws 20 replaced in the holes 22 to maintain the die member in that position. It will be appreciated that other die members having a further variety of dies or work-engaging portions may be substituted for the die head 15, providing such die members or heads have at least two adjacent flat faces at right angles to each other so that the die head may be properly seated in the trough 11. It is contemplated that a die member having only two flat faces at right angles, and in which the remainder of the die member between the divergent ends of the two flat faces is the work-engaging portion, may be used.

In the bottom of the trough 11 a channel 14 may be provided to give a clearance for protruding die portions which are not in use and also to assure positive seating of the flat faces 16 of the die member or die head 15 with the corresponding surfaces 12 of the trough, particularly in the event that dirt or particles accumulate in the trough.

It will be appreciated that the disclosed embodiment of the invention fulfills the objects of providing a die device having a readily removable die head with selectively interchangeable work-engaging dies without the removal of the entire die device from the machine; and, that it provides a die device which is less expensive and provides more die shapes.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described our invention, we claim:

1. A bending and forming die device for use in press brakes comprising a die holder member having a die-head-receiving trough defined by two faces disposed substantially at right angles to each other, a die head having faces at right angles to each other, work-engageable portions of selected shape disposed between the faces of the die head, means engageable with the end portions of said die head for removably holding said die head in said die-head-receiving trough with one of said work-engageable portions in work engaging position.

2. A bending and forming die device for use in forming machines comprising a die head having faces disposed at right angles to each other, said faces being joined by work-engageable portions, means for removably supporting the die head on two adjacent faces, with the work-engageable portion remote from said adjacent faces in work-engaging position, and means engageable with the end portions of said die head for removably securing the same on said supporting means.

3. A bending and forming die device for use in forming machines, comprising a die head having four faces, adjacent faces being disposed at right angles, connecting portions between adjacent faces, said connecting portions having selected work-engageable die shapes, a die holder having a die-head-receiving trough defined by two flat faces disposed at right angles to each other for supporting said die head on two adjacent die faces with the work-engageable die shape of the connecting portion between the other two die faces in work engaging position and means engageable with the end portions of said die head for releasably retaining the head in the selected position in the trough.

4. The device of claim 3 wherein the shape of one of the connecting portions is an extension of the adjacent faces to a right angular edge.

5. The device of claim 3 wherein the surfaces defining the die head receiving trough are separated by a channel defined in the die holder at the bottom of said trough.

References Cited in the file of this patent

UNITED STATES PATENTS

| | | |
|---|---|---|
| 338,100 | Ohl | Mar. 16, 1886 |
| 610,585 | Guild | Sept. 13, 1898 |
| 1,237,195 | Garguilo | Aug. 14, 1917 |
| 2,456,749 | Steibel | Dec. 21, 1948 |